United States Patent [19]

Bose

[11] Patent Number: 4,490,203

[45] Date of Patent: Dec. 25, 1984

[54] METHOD FOR SLITTING AND/OR SEALING PLASTIC FILM MATERIAL

[75] Inventor: Ajit Bose, Rexdale, Canada

[73] Assignee: Leco, Inc., Rexdale, Canada

[21] Appl. No.: 523,872

[22] Filed: Aug. 17, 1983

Related U.S. Application Data

[62] Division of Ser. No. 363,074, Mar. 29, 1982, Pat. No. 4,414,051.

[51] Int. Cl.$^3$ ............................................. B32B 31/00
[52] U.S. Cl. ................................ 156/251; 156/272.8; 156/380.9; 156/515
[58] Field of Search ............... 156/244.14, 251, 272.8, 156/515, 380.9, 250, 198, 229; 219/121 LD, 121 LG, 121 LN, 121 LM

[56] References Cited

U.S. PATENT DOCUMENTS

| | | | |
|---|---|---|---|
| 2,990,875 | 7/1961 | Samuels et al. | 156/251 |
| 3,560,291 | 2/1971 | Foglia et al. | 156/229 |
| 3,790,744 | 2/1974 | Bowen | 156/250 |
| 3,989,778 | 11/1976 | Osborne | 156/272.8 |

*Primary Examiner*—Jay H. Woo
*Assistant Examiner*—Timothy W. Heitbrink
*Attorney, Agent, or Firm*—Samuel Meerkreebs

[57] ABSTRACT

This invention provides an improvement in a method of slitting and sealing two or more layers of plastic film material in contact with each other. The improvement comprises slitting and sealing the layers with a light beam generated by a laser. The beam intensity is such that the temperature of the beam at the surface of the film is at a point sufficient only to raise the enthalpy of the material to the transition point between the molten and solid states of the material, whereby bead formation is reduced or eliminated at the seal. Methods are also disclosed for slitting a larger single sheet of material into two or more smaller sheets of material as well as for providing microperforations or microporous plastic material by the use of a pulsing beam generated by a laser.

3 Claims, No Drawings

METHOD FOR SLITTING AND/OR SEALING PLASTIC FILM MATERIAL

This application is a division of my co-pending application Ser. No. 363,074 filed on Mar. 29, 1982 now U.S. Pat. No. 4,414,051 and titled "Method for Slitting and/or Sealing Plastic Film Material".

This invention relates to a method of forming two or more smaller tubes from a blown-tube following extrusion, according to one embodiment thereof; in a further embodiment, this invention relates to a method of providing microporous or microperforated or microvented plastic film material.

One of the more common methods of producing thermoplastic material is by the blown-tube process. Briefly, extrudable resins are extruded utilizing an extruder which mixes the resin and renders it molten, whereafter the molten material is subsequently passed through a die to form a bubble or tube utilizing a different air pressure. The actual details of the blown tube method are well known to those skilled in the art and reference may be had to numerous patents in this art— for example, Canadian Pat. No. 460,963 illustrates such a method.

In the blown-tube process, as the molten material emerges from the extrusion die, it is in the form of a tube or bubble which is in a molten condition at the die lips and stays that way for some distance following extrusion, i.e., until it is cooled sufficiently to solidify and form a solid film-forming material. Following extrusion from the die, the molten bubble is expanded by the differential pressure between the inside of the bubble or tube and the atmosphere to provide a film of the desired thickness which is achieved by controlling several variables including, e.g., the air pressure in conjunction with the amount of resin extruded, etc.

The blow-up ratio of any extruded material is likewise dependent on several factors including the type of resin being extruded, the desired output from a die and in turn, all of this influences the size of the bubble which is produced in the blown-tube process. For production purposes, it is quite desirable, in most cases, to utilize a maximum production output for any given die size and configuration, but depending on the type of product desired, this is not always possible or desirable. Thus, for example, when it is desired to produce tubing by the blown-tube process for subsequent formation into bags, such as those disclosed and claimed in Canadian Pat. No. 734,800, tubing of the desired bag width may have to be produced resulting in lower outputs than is normally possible for a die of a given size.

In other cases, and as has been carried out in practice, a tube of possibly twice the size of the desired width of the final bag may be produced by the blown-tube process; the tube subsequently being collapsed upon solidification and wound up in rolls. Thereafter, in an out-of-line process, utilizing bag-making machinery, a wound roll of the polyethylene tubing may subsequently be fed through a bag-making apparatus in which the flattened or lay-flat tubing is unwound, subsequently slit conventionally by means of a hot knife or hot blade arrangement in the axial direction, with the hot knife or a subsequent step being employed to side seal the slit tube so as to form two separate widths of tubing, each having a desired width for the bag.

The operation of splitting a single tube into two or more tubes, of the desired width for subsequent bag formation, has normally had to be carried out in an out-of-line operation since if the tube were slit using the hot knife or hot blade principle in an in-line operation with the extrusion of the tube, it has been found that the resulting bead formed in the axial or lengthwise direction of the tube, on the same production line or system which is used to produce the blown-tube from the extrusion process, would result in a pair of tubes which on wind-up at the end of the process, would be unacceptable. The unacceptability of the tube results from the fact that at any time when a tube of polyethylene or the like is slit and sealed using the hot blade or hot knife technique, a bead which may be up to 30 to 40% more, and sometimes twice, the total thickness of the lay-flat tubing is formed at the point where the original tube is slit and sealed so that on wind-up, at least one side of the resulting two tubes has a thickness up to twice that which would occur on the other side of the lay-flat tubing. Not only would it be impossible to obtain a wound roll of tubing having uniform roll geometry (which is necessary for subsequent operations), but any resulting wound roll would have the side which is slit-sealed with the hot knife technique in a non-uniform arrangement which would result in difficult feeding and subsequent control in the bag-forming operation.

Thus, in summary, for producing bags using the blown-tube process, it has been found that either a single bag width must be produced using possibly only a fraction of the die capacity, which can then be formed into individual bags in an in-line process or alternatively, if larger diameters of blown-tubes are produced from an extrusion die, the large diameter tube must be subsequently wound up in a lay-flat condition and then transferred to a separate out-of-line bag-making apparatus and process in which the tube is slit and sealed with the hot knife or hot blade technique during the bag-making process. Obviously, it would be desirable if some technique could be developed whereby a large diameter tube capable of making three or four individual tubes, in an in-line process with the extrusion of the blown bubble or tube, could be obtained whereby uniform rolls having substantially uniform roll geometry could be produced and these in turn may be utilized by an in-line process for producing bags, or alternatively, wound up into rolls of substantially uniform roll geometry and subsequently used in individual bag-making processes.

With this invention, applicant has developed a process for forming two or more tubes in an in-line technique using the blown-tube process, in which method two or more smaller tubes of blown film from a larger single tube of blown tube of a greater diameter than the smaller tubes, can be obtained, the method comprising the steps of extruding said larger tube by the blown-tube process, and after said tube is formed, but prior to winding up said tube into rolled tubing, severing and sealing said larger tube in the axial or lengthwise direction of movement of said tube, by contacting said tube with a beam generated by a laser while controlling the temperature of the beam at the surface of the film to a point sufficient only to raise the enthalpy of the material of the tube to the transition point between the molten and solid states of the material, whereby said laser beam severs and seals said larger diameter tube into two or more smaller tubes with axial or longitudinal seams of substantially similar thickness to the thickness of the layers of film comprising said blown tube. Optionally, in another embodiment, the beam of the laser may be controlled so as to provide a temperature of the material up to a point of not more than 25% greater than the final transition point temperature of the material.

In greater detail of the present invention, applicant has found that by subjecting the larger diameter blown tube to a laser beam, which will sever and seal the larger diameter tube into two or more smaller diameter tubes, that the disadvantages of the prior art have been overcome and in addition, such a method provides further advantages which ensure to the benefit of the resulting tube and products produced therefrom. More specifically, the use of a laser beam for severing and sealing a larger diameter tube has been found to result in a weld or seam thickness which is not substantially greater (i.e., which is not more than about 5% greater in thickness) than the thickness of the combined layers of the blown tube at the point where the laser beam has been used to sever and seal the larger diameter tube into two or more smaller diameter tubes. This is in contrast to the conventional procedures described above which result in a weld or seam thickness up to twice that of the normal thickness of the layers of the blown tube material forming the tubes adjacent the point where the tubes are otherwise slit and sealed by the conventional hot knife or hot blade technique. In addition, it has been found that the seal strength resulting from utilizing the laser technique results in improved seal strength. Conventionally, using a hot blade or hot knife technique, the seal strength may range up to 40 or 50% of the strength of the material of the blown tube, but when using a laser beam for severing and sealing the larger tube, it is now possible to obtain up to 80% or more of the strength of the blown tube in an unsevered and unsealed condition. This point has significant advantages for use in the formation of, e.g., bags produced from the lengths of blown tubing since the weakest point of the bag structure is well known to those skilled in the art to be the point at which the bag has been sealed—i.e., the position and location of any seals in the bag structure. Obviously, with a side seal in a bag which only has 40 to 50% of the strength of the balance of the bag, the weakest point is the side seal seam which may split in use. Conversely, by increasing the strength of the side seals, or indeed any other seals in the bag by utilizing the laser technique described herein, whereby the seal strength is 80% or more of the strength of the material otherwise used in the bag, it may be possible, depending on certain applications, to reduce the thickness of the material otherwise employed in the bag to arrive at the same strength as comparable conventional bags which are formed using the hot knife or hot blade technique.

Thus, for example, if it is desired to form bags having a given tear strength or burst strength, which has to take into account the weakest point in the bag structure as being the side seal produced by the hot blade technique, the given strength of the bag may have to employ up to twice the normal thickness for the thicknes of the material otherwise required due to the inherent weakness and strengths of the side seal in the bag. By employing the method of the present invention, the material thickness of the bag, resulting in economies in material production, can be obtained up to 80% or more of the strength of the material as otherwise used in the bag, using the laser beam technique.

In the method of the present invention, the use of a beam generated by a laser has the effect of disrupting the molecular structure of the material and because the temperature of the laser beam at the surface of the material being slit is controlled as outlined above, there is no bead build-up as in the prior art techniques. This unexpected feature of the laser beam utilized for slitting material permits subsequent sealing of the material by re-organizing the molecular chains which are otherwise severed by the beam and consequently, the lack of build-up is obtained. Taking low density polyethylene of 0.92 density for example, and by controlling the temperature of the laser beam to raise the enthalpy of the film between the transition point for the molten and solid states, the laser beam will slit the tube at between 120° and 180° F., with freedom from bead formation. If desired, in an optional embodiment of the present invention, the enthalpy characteristics of the film being treated may utilize a laser beam in which the beam itself is stronger than that described above so that a temperature above or up to 25% greater than the transition temperature between the solid and molten states is utilized, with the resulting build-up of the bead being still less than about 5% variation in tube thickness. Typically, for the same low density film (e.g., having a density of 0.92), a temperature of about 180°-200° F. generated by the laser may be used (which is still way below the conventional hot knife which utilizes temperatures of around 400° F.) and the advantages of the present invention may still be obtained where a substantially uniform film thickness across the tube is obtained.

In a particularly preferred embodiment of the present invention, the apparatus known in the art as an argon or helium laser may be employed. These are so-called "cold lasers" as opposed to the so-called "hot-lasers" which produce a light beam using a high temperature for purposes of e.g., cutting through metals. As will be appreciated, the nature and type of laser equipment used in the method of the present invention does not form any part, per se, of the invention and selection of the appropriate type of laser equipment may be readily made by those skilled in this art, depending on the type or resin, the speed of production, etc. In general, as will be appreciated by the skilled person in the art familiar with lasers, the beam generated by a laser may also be selected having regard to the variables which apply to film or tubing produced by the blown tube method based on principles known to those skilled in the art. Specifically, this will involve residence or dwell time as applied to the material being treated—i.e., relative to the speed of the material being produced and the width of the laser beam at the point of the surface of the material (the width of the laser beam used to slit the material-)—in most embodiment, it is preferred to use a very narrow beam so as to reduce the energy requirements.

Thus, in its broad sense, this invention provides a method of slitting and sealing two or more layers of plastic film material in contact with each other, the method comprising the steps of slitting and sealing the layers with a light beam generated by a laser in which the beam intensity is such that the temperature of the beam at the surface of the film is at a point sufficient only to raise the enthalpy of the material of the tube to the transition point between the molten and solid states of the material.

With this invention, typically a laser beam generated by an argon or helium type may be employed in conjunction with large die sizes to extrude large diameter bubbles—e.g., 80 inches or more, which are severed and sealed into three or four smaller diameter bubbles of, e.g., 20 inches or less each, all in an in-line process. Still further, as will be appreciated, different size smaller tubes can be produced where different sized bags are desired. Thus, the full advantage of the extrusion capacity can be taken into consideration and utilized.

The method of this invention can be carried out at any point following tube-collapse and before wind-up if an out-of-line process is being employed for subsequent bag formation—or alternatively, with an in-line process for bag formation, at the point following tube collapse but prior to any process and operations being employed for individual bag formation. To this end, one or more laser beams may be positioned in the extrusion system to project a laser beam at the point or points where it is desired to slit/seal the larger tube into two or more smaller tubes, at which point the two smaller tubes are separated from the larger tube and subsequently utilized in the manner described above. In a typical blown tube process, following tube extrusion and cooling of the molten tube into a solidified tube, a pair of nip rolls collapse the blown tube into a lay-flat condition and it is following this point that the laser beam may be applied to the larger diameter tube.

The process is applicable to numerous types of film material including, for example, high and low density polyethylene conventionally used in bag forming operations. Other material which may be treated by the method of this invention includes nylon, polyester, etc.

A modification of the above method, in an on-line or out-of-line operation, is to take polyethylene or the like film, e.g., high density polyethylene material, and to use a laser beam to slit (only) the film which is in a single layer into sheets of a desired width and/or length. One particular application of this embodiment involves the formation of food wrapping sheets, such as is employed in hamburger wrapping sheets. In this embodiment, film is produced by the blown tube process into a single sheet of larger width and thereafter, the film is slit axially or transversely into sheets of a size sufficient for wrapping food. Typical dimensions of such sheets may be 6×6 inches or 8×8 inches and may be made of high density polyethylene material. Thus, a laser beam may be employed to slit, without sealing (since there is only a single ply of material) and again, the variables disclosed above with respect to controlling the temperature of the beam at the surface of the material would be most desirably employed so as to avoid any beading at the edges of the film material.

In a still further embodiment of the present invention, it has also been found that the laser beam may be utilized to form microporous or micro-vented sheet material in an in-line process. To this end, an arrangement similar to that described above may be employed whereby a pulsing laser beam may be employed to project the laser beam onto the flattened tubing and to produce minute apertures or holes in the material. By way of explanation, many types of consumer products formed from resins such as polyethylene and which are in the form of bags, require apertures or holes in them to permit loading of a commodity into the bag (so that the air can evacuate from the bag). Examples of such products are bags which contain vegetables, or shrink packages, etc. Up until now, lengths of tubing are normally formed in which the bag is either subsequently treated with a punch press or the like to create the apertures in the tubing lengths, either in a separate operation or during the process of printing the bags where the roll of film material is unwound.

By employing the further embodiment of this invention, a laser beam may be utilized, by pulsing the beam, to create apertures in the tube after formation of the tube and preferably following collapsing of the tube by the aforementioned nip rolls. In this manner, a very simple and direct method of forming apertures or microporous holes in the film is obtained.

It will be understood that various modifications can be made to the above-described embodiments without departing from the spirit and scope of the invention defined herein.

I claim:

1. In a method of slitting and sealing two or more layers of plastic film material in contact with each other, the improvement comprising slitting and sealing said layers with a light beam generated by a laser in which the beam intensity is such that the temperature of the beam at the surface of the film is at a point sufficient only to raise the enthalpy of the material to the transition point between the molten and solid states of said material, whereby bead build-up is reduced or eliminated at the seal, and in which the seal strength of the seal is greater than a similar corresponding hot knife seal.

2. A method as defined in claim 1, wherein said laser beam is a beam generated by an argon or helium means.

3. A method of forming two or more smaller sheets of plastic material from a larger single sheet of said material comprising the steps of providing said larger single sheet of plastic material, and slitting said sheet with a beam generated by a laser while controlling the temperature of the beam at the surface of the material to raise the enthalpy of the material to the transition point temperature between the molten and solid states of the material.

* * * * *